March 30, 1965  J. W. SCHUKRAFT  3,175,271
CLAMPING DEVICE
Filed Oct. 25, 1961  2 Sheets-Sheet 1
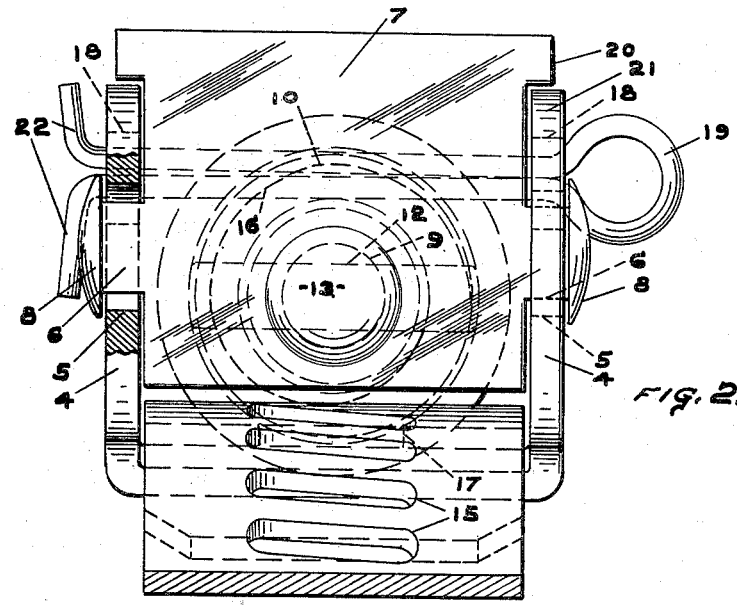
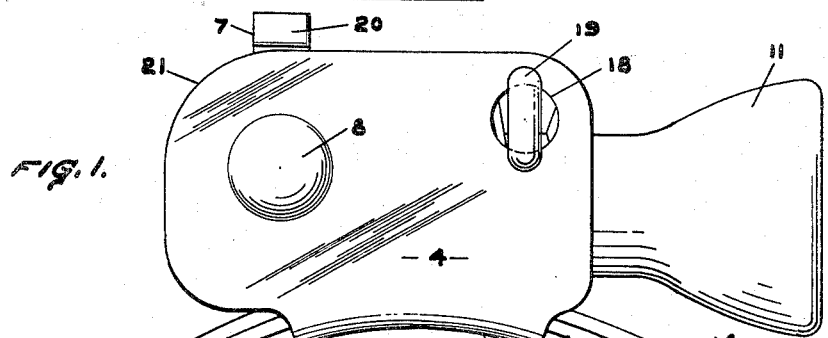
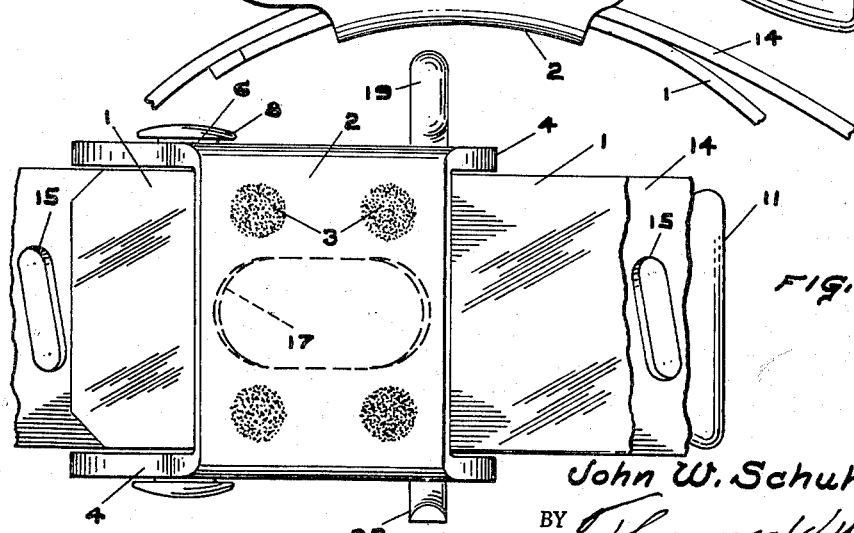
INVENTOR
John W. Schukraft
BY Thomas W. Y. Clark
ATTORNEY INVENTOR
John W. Schukraft.
BY Thomas W. J. Clark
ATTORNEY

United States Patent Office 3,175,271
Patented Mar. 30, 1965

3,175,271
CLAMPING DEVICE
John W. Schukraft, Towson, Md., assignor to Murray
Corporation, a corporation of Maine
Filed Oct. 25, 1961, Ser. No. 147,683
5 Claims. (Cl. 24—274)

This invention relates to a quick action hose clamp in which the ends of the loop strap are held and forced together by a tangential screw which rotates bodily from its end to engage the strap and be released by the swing of the screw.

An object of the invention is to provide a bodily swinging screw with a limited swing, which may be moved into and out of engagement with the strap. Another object of the invention is to provide a clamp which may be adjusted for both large and small diameter hose quickly and then tightened. Another object of the invention is to place the axis of the trunnions on which the screw swings bodily above the axis of the screw in the block carrying the trunnions so that tightening of the screw holds it in engagement with the strap. Another object of the invention is to limit the bodily throw of the screw in its mounting block to substantially 90° so that it may be more readily engaged upon the insertion of the strap under the screw and so that the screw will not obstruct the strap insertion thereunder.

Another object of the invention is to provide a pin across the top of the screw well spaced from its pivot point when in strap engagement to securely hold the screw in assembly with the strap and the threads in the strap, so that the clamp is shake-proof in its assembly and any amount of vibration will not swing the screw out of engagement with the threads on the strap. Another object of the invention is to make the orifices for the pin in the housing walls holding the screw and its assembled block large for the ready insertion of the cotter pin and yet the cotter pin will hold firmly against the screw's upper side. The pin will even permit the screw to be unscrewed by an unskilled operator without injury to the clamp.

Another object of the invention is to head the ends of the trunnions on the block against the outer parallel walls of the frame both to maintain the walls together and to positively retain the block between them, even should excessive pressure be placed on the screw.

Other objects and advantages of the invention will be apparent from the following description and the accompanying drawings forming a part hereof and in which:

FIGURE 1 is a side elevational view of the clamp showing only a portion of the strap.

FIGURE 2 is an elevational view, partly in section from the left of FIGURE 1.

FIGURE 3 is an inverted plan view of the clamp with the strap broken away.

Figure 4:
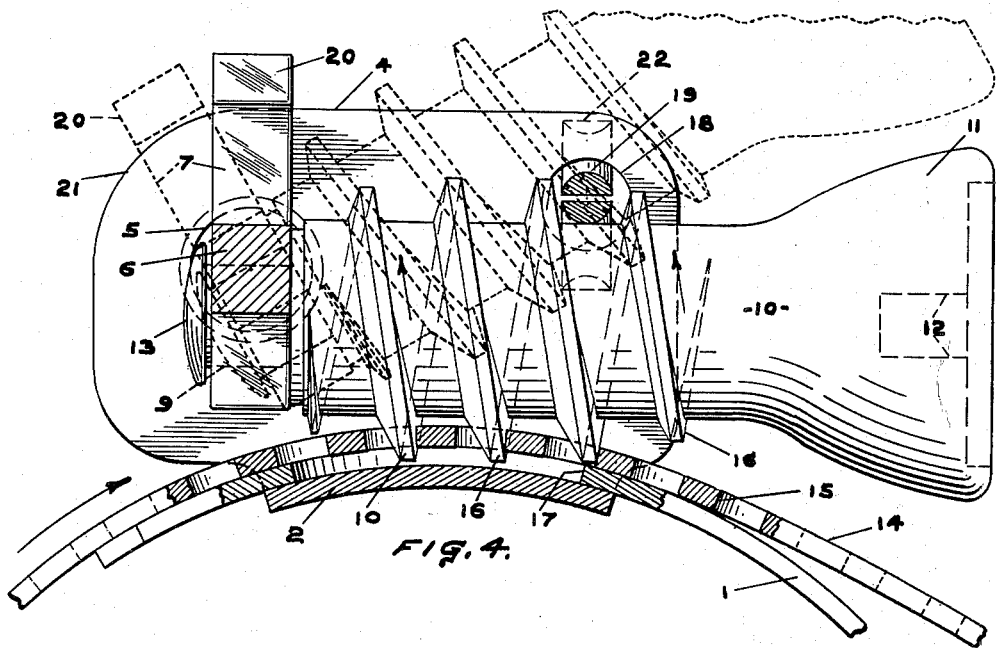
FIGURE 4 is a vertical sectional view of the clamp.
Figure 5:
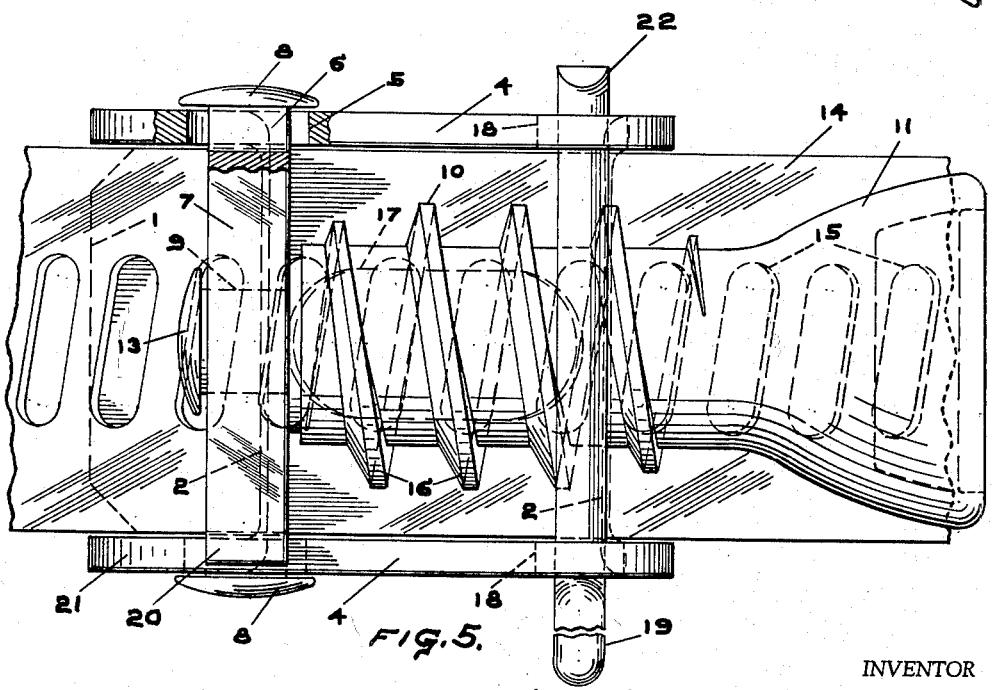
FIGURE 5 is a top plan view of the clamp partly in section.

In the drawings similar numerals refer to similar parts throughout the several views. The strap 1 is welded to the frame 2 as shown at 3 the frame having the upstanding parallel walls 4 on each side of the strap. The frame walls are provided with transversely aligned openings 5 at their ends close to the strap end to receive therein trunnions 6 of block 7 which are rolled over at their ends 8 to form heads to hold the frame sides together and to hold the block securely within the frame walls. The block 7 has an opening 9 transversely centrally thereof to receive therein the end of screw 10 which is headed as shown at 11 and has a screwdriver receiving slot 12 therein. The pointed end of the screw is headed as shown at 13 to securely hold it within the block 7. The free end 14 of the strap 1 is threaded as shown by openings 15 to receive therein the threads 16 of the screw as shown in FIGURE 4. The end of the strap 1 is cut out as shown at 17 to permit the threads to project beyond the threads 15 in the free end of the strap as likewise shown in this FIGURE 4, thereby providing a firm hold for the screw threads in the openings 15 comprising the threads in the strap. The axis of the screw within the block is beneath the axis of the trunnions 6 so that tightening the screw holds the screw down into tighter engagement with the free end of the strap and its threads.

Openings 18 are provided at the other end of the frame walls 4 near their upper outer edge to receive therein a cotter pin 19. The openings 18 are large and their upper edges are so positioned as to hold the cotter pin down substantially against the screw to prevent it from shaking or pivoting up on its trunnions upon the vibration of the article held by the clamp and preventing the release of the screw from the strap. The holes 18 are made large to allow for the ease of threading and also to permit the use of a relatively large punch for their making.

The block 7 has projecting from its upper edges ears 20 which ride around the rounded corners 21 of the substantially rectangular walls of the frame the corners being substantially concentric with the openings 5. The ends of the frame walls adjacent openings 5 provide an abutment-like portion against which the ears 20 strike. These ears 20 limit the movement of the block to substantially 90° upon striking the abutment-like portions of the frame walls and thereby limit the throw of the screw so that before the insertion of the cotter pin, the strap free end may be wrapped around an article to be clamped and inserted under the block and the screw and tightened by hand and then the screw is swung down in place so its threads engage with the threads in the strap free end. The ears 20 maintain the screw in place for this swinging operation allowing a minimum of waste motion and no interference with the threading operation of the free end of the strap within the frame. The strap is tightened about the object to be clamped by the axial rotation of the screw and then the cotter pin is placed in the openings 18 and tangential with the screw and then the ends of the cotter pin are bent over as shown at 22, when the cotter pin and screw and clamp are fixedly maintained in place. It will be apparent that a shakeproof assembly is thus provided alowing for quick assembly about an object, and quick release is preferably obtained by the removal of the cotter pin and the upward swing of the screw.

It will be apparent that many modifications may be made in the precise construction above described without departing from the invention defined in the following claims.

What is claimed as new and is desired to be secured by Letters Patent is:

1. A clamping device comprising a strap for encircling an object to be clamped, the opposite ends of which, in operation of the clamp, lap one upon the other, upwardly projecting side walls unitarily carried by the underlapping portion of the strap, a block and a clamping screw therein the block being pivotally mounted between said walls, above the overlapping portion of the strap, the side walls providing abutment-like portions thereon adjacent the pivotal mounting therein of the block, threads in said overlapping portion of the strap cooperating with said screw to tighten the strap upon an object, the screw pivoting with the block, thereby pivoting the screw to and from strap engagement, the block having ears projecting above the side walls to engage said abutment-like portions on the side walls in pivotal movement of the block to limit said block and screw from strap engagement when the screw on the block is pivoted substantially 90° from strap engagement.

2. A clamping device comprising a strap for encircling an object to be clamped, the opposite ends of which, in operation of the clamp, lap one upon the other, upwardly projecting side walls unitarily carried by the underlapping portion of the strap, a block and a clamping screw therein the block being pivotally mounted between said walls, above the overlapping portion of the strap, threads in said overlapping portion of the strap cooperating with said screw to tighten the strap upon an object, the screw pivoting with the block, thereby pivoting the screw to and from strap engagement, the side walls having openings spaced longitudinally of the strap from the block, transversely aligned with the periphery of the screw when in threaded strap engagement and a cotter pin passing through said last named openings to secure the screw fixedly in threaded strap engagement.

3. A clamping device comprising a strap for forming a loop about an object to be clamped, opposed side walls extending unitarily upwardly from one end of the strap, the side walls having transversely aligned openings therein adjacent the strap end and a block and a clamping screw therein, the block having side projecting trunnions pivotally mounted in said openings, the side walls providing abutment-like portions thereon adjacent the aligned openings therein, said walls receiving therebetween and beneath the block the other end of the strap, the screw pivoting with the block, thereby pivoting the screw to and from the strap between the side walls, the said other end of the strap being threaded and tightened about an object upon engagement by the screw and the rotation thereof, the block having ears projecting over the said walls and engaging said abutment-like portions to limit the pivotal movement of the screw and block, when the screw is pivoted substantially 90° from the threaded strap end from strap engagement.

4. A clamping device comprising a strap for forming a loop about an object to be clamped, opposed side walls extending unitarily upwardly from one end of the strap, the side walls having transversely aligned openings therein adjacent the strap end and a block and a clamping screw therein, the block having side projecting trunnions pivotally mounted in said openings, the side walls providing abutment-like portions thereon adjacent the aligned openings therein, said walls receiving therebetween and beneath the block the other end of the strap, the screw pivoting with the block, thereby pivoting the screw to and from the strap between the side walls, the said other end of the strap being threaded and tightened about an object upon engagement by the screw and the rotation thereof, the side wall edges adjacent the said openings in the walls being substantially concentric with the openings and the block having ears projecting over the side walls adjacent their concentric edges and engaging said abutment-like portions to limit the pivotal movement of the screw and block, when the screw is pivoted substantially 90° from the threaded strap end from strap engagement.

5. A clamping device comprising a strap for forming a loop about an object to be clamped, opposed side walls extending unitarily upwardly from one end of the strap, the side walls having transversely aligned openings therein adjacent the strap end and a block and a clamping screw therein, the block having side projecting trunnions pivotally mounted in said openings, said walls receiving therebetween and beneath the block the other end of the strap, the screw pivoting with the block, thereby pivoting the screw to and from the strap between the side walls, the said other end of the strap being threaded and tightened about an object upon engagement by the screw and the rotation thereof, the side walls having openings spaced longitudinally of the strap from the block, transversely aligned with the periphery of the screw when in threaded strap engagement and a cotter pin passing through said last named openings to secure the screw fixedly in threaded strap engagement.

References Cited in the file of this patent

UNITED STATES PATENTS

| 2,189,172 | Hathorn | Feb. 6, 1940 |
| 2,345,832 | Pritchard | Apr. 4, 1944 |
| 2,607,092 | Rubly | Aug. 19, 1952 |
| 2,767,455 | Schaefer | Oct. 23, 1956 |
| 2,825,113 | Schaefer | Mar. 4, 1958 |

FOREIGN PATENTS

| 607,598 | Great Britain | Sept. 2, 1948 |